United States Patent
Kim et al.

(10) Patent No.: US 7,203,251 B2
(45) Date of Patent: Apr. 10, 2007

(54) APPARATUS FOR COMPENSATING PHASE OF RECEIVER AND METHOD THEREOF

(75) Inventors: Young-Wan Kim, Daejon (KR); Yun-Jeong Song, Daejon (KR); Nae-Soo Kim, Daejon (KR); Ho-Jin Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 388 days.

(21) Appl. No.: 10/960,415

(22) Filed: Oct. 6, 2004

(65) Prior Publication Data
US 2005/0141654 A1 Jun. 30, 2005

(30) Foreign Application Priority Data
Dec. 27, 2003 (KR) ............. 10-2003-0098408
May 19, 2004 (KR) ............. 10-2004-0035726

(51) Int. Cl.
*H04L 27/00* (2006.01)
*H00B 7/212* (2006.01)
(52) U.S. Cl. .............. 375/316; 375/326; 455/324
(58) Field of Classification Search ............ 375/345, 375/316, 326, 371–376; 329/306–308; 327/141, 327/144, 146–150; 455/324
See application file for complete search history.

(56) References Cited

U.S. PATENT DOCUMENTS

| | | | | |
|---|---|---|---|---|
| 5,263,196 A | * | 11/1993 | Jasper | 455/324 |
| 6,535,560 B1 | * | 3/2003 | Masenten | 375/261 |
| 7,020,226 B1 | * | 3/2006 | Kirkland | 375/355 |
| 7,031,688 B2 | * | 4/2006 | Malone et al. | 455/318 |
| 7,133,657 B2 | * | 11/2006 | Kuenen et al. | 455/324 |
| 2004/0002322 A1 | * | 1/2004 | Krupezevic et al. | 455/323 |
| 2005/0105648 A1 | * | 5/2005 | Masenten | 375/316 |
| 2005/0123067 A1 | * | 6/2005 | Kim et al. | 375/298 |

FOREIGN PATENT DOCUMENTS

KR 1997-62993 4/1999
KR 2000-41013 7/2000

OTHER PUBLICATIONS

"Digital Filter Equalization of Analog Gain Phase Mismatch in I-Q Receivers", Harris, IEEE International Conference on 5th Universal Personal Communications, vol. 2, pp. 793-796, 1996.

\* cited by examiner

*Primary Examiner*—Tesfaldet Bocure
(74) *Attorney, Agent, or Firm*—Blakely Sokoloff Taylor & Zafman

(57) ABSTRACT

The present invention provides an apparatus for compensating a phase difference of a receiver, the apparatus including: an accumulating unit for accumulating a radio frequency (RF) input signal and generating an accumulated RF signal in order to minimize an effect of a background noise of the RF input signal; a early-local oscillating unit for generating a phase-early local oscillated signal based on a local oscillated signal of the receiver; a late-local oscillating unit for generating a phase-late local oscillated signal based on a local oscillated signal of the receiver; a phase early-late compensating unit for compensating a phase early-late based on the accumulated RF input signal and the phase-early and phase-late local oscillated signals; a look-up table data mapping unit for controlling a phase of the local oscillated signal with respect to a phase difference; and a feedback transmitting unit for transmitting a phase compensating data to the local oscillator.

8 Claims, 12 Drawing Sheets

FIG. 5

| PHASE ERROR | $r_y^{early}$ | $r_y^{late}$ | e |
|---|---|---|---|
| 0° | 0.866 | 0.866 | 0 |
| 10° | 0.766 | 0.9397 | -0.1736 |
| 20° | 0.6428 | 0.9848 | -0.342 |
| 30° | 0.5 | 1 | -0.5 |
| 40° | 0.342 | 0.9849 | -0.6428 |
| 50° | 0.1736 | 0.9397 | -0.766 |
| 60° | 0 | 0.866 | -0.866 |
| 70° | -0.1736 | 0.766 | -0.9397 |
| 80° | -0.342 | 0.6428 | -0.9848 |
| 90° | -0.5 | 0.866 | 0 |
| -10° | 0.9397 | 0.766 | 0.1736 |
| -20° | 0.9848 | 0.6428 | 0.342 |
| -30° | 1 | 0.5 | -1 |
| -40° | 0.9848 | 0.342 | 0.6428 |
| -50° | 0.9397 | 0.1736 | 0.766 |
| -60° | 0.866 | 0 | 0.866 |
| -70° | 0.766 | -0.1736 | 0.9397 |
| -80° | 0.6425 | -0.342 | 0.9848 |
| -90° | 0.5 | -0.5 | 1 |

APPARATUS FOR COMPENSATING PHASE OF RECEIVER AND METHOD THEREOF

FIELD OF THE INVENTION

The present invention relates to an apparatus and a method for compensating a phase of a receiver; and, more particularly, to an apparatus and a method for compensating a phase of a receiver in order to improve receiving performance degradation which occurred due to a phase difference between a received radio frequency (RF) signal and a local oscillated signal of a direct conversion receiver or a digital receiver.

DESCRIPTION OF RELATED ART

Generally, an input signal and a local oscillated signal are compensated in a baseband.

In a heterodyne receiver having a plurality of local oscillators, a signal processing in the baseband is useful because a phase difference is more frequently occurred at middle part than at a radio frequency (RF) receiving unit. However, because a direct conversion receiver converting an input signal into a baseband signal has a local oscillator, a phase difference of the RF input signal can be compensated by controlling a local oscillator at the RF receiving unit. Compensating the phase difference at the RF receiving unit improves a speed of phase compensation.

Hereinafter, a conventional direct conversion receiver and a conventional method for compensating a phase difference between a RF input signal and a local oscillated signal are described.

FIG. 1 is a block diagram showing the conventional direct conversion receiver.

As shown, the direct conversion receiver 100 includes an amplifier 110, multiplexers 120 and 130, a local oscillator 140 and low pass filters 150 and 160.

The amplifier 110 amplifies a RF input signal 101 to generate an amplified RF signal and transmits the amplified RF signal to the multiplexers 120 and 130.

The local oscillator 140 generates a local oscillated sine signal and a local oscillated cosine signal, which are in phase with the RF input signal 101.

The amplified RF signal is multiplexed with the local oscillated sine signal 102 and the local oscillated cosine signal 103 at the multiplexer 120 and 130, respectively.

A multiplexed sine signal is filtered at the low pass filter 150. The low pass filter 150 generates an I channel signal. A multiplexed cosine signal is filtered at the low pass filter 160. The low pass filter 160 generates a Q channel signal. Therefore, the direct conversion receiver 100 generates a base band signal 104 including the I channel signal and the Q channel signal.

The local oscillated signal in phase with a carrier signal from the local oscillator 140 is used in order to demodulate a modulated signal inputted to the direct conversion receiver 100 and a digital receiver. The local oscillated signal which is out of phase with the RF input signal decreases the performance of the demodulated signal. Thus, it is required that a method for compensating a phase difference between the modulated and the local oscillated signal and for maintaining a transmission quality.

A conventional phase compensator proposed in an article by Fred Harris, entitled "Digital filter equalization of analog gain and phase mismatch in I–Q receivers", IEEE International Conference on the Universal Personal Communications, Vol. 2, pp. 793~796, on September, 1996" is shown in FIG. 2.

FIG. 2 is a block diagram illustrating an apparatus for compensating a phase difference between an input signal and a local oscillated signal in accordance with a preferred embodiment.

The phase compensator 200 receives the baseband signal, i.e., I channel signal and Q channel signal form the direct conversion receiver 100 and compensates the phase difference by a phase corrector 210 and a gain corrector 220 based on the baseband signal.

Because the phase corrector 210 compensates the phase difference based on the baseband signal, the speed of the phase corrector 210 is changed according to the phase difference size between the RF input signal and the local oscillated signal. Therefore, it is required an apparatus for controlling a phase of the local oscillated signal.

SUMMARY OF THE INVENTION

It is, therefore, an object of the present invention to provide an apparatus for compensating a phase difference of a receiver in order to extract a phase of a RF input signal, a method and computer-readable media that implements the method thereof. The apparatus minimizes an effect of a background noise by using an accumulator, generates phase early-late local oscillated signals, generates a phase compensating data for controlling a phase of the local oscillated signal and compensates the phase difference at the RF inputting part of the receiver.

In accordance with an aspect of the present invention, there is provided an apparatus for compensating a phase difference of a receiver, the apparatus including: an accumulating unit for accumulating a radio frequency (RF) input signal and generating an accumulated RF signal in order to minimize an effect of a background noise of the RF input signal; an early-local oscillating unit for generating a phase-early local oscillated signal based on a local oscillated signal of the receiver; a late-local oscillating unit for generating a phase-late local oscillated signal based on a local oscillated signal of the receiver; a phase early-late compensating unit for compensating a phase early-late based on the accumulated RF input signal and the phase-early and phase-late local oscillated signals; a look-up table data mapping unit for controlling a phase of the local oscillated signal with respect to a phase difference from the phase early-late compensating unit; and a feedback transmitting unit for transmitting a phase compensating data from the look-up table data mapping unit to the local oscillator.

In accordance with another aspect of the present invention, there is provided a method for compensating a phase difference of a receiver, the method including the steps of: receiving an radio frequency (RF) input signal and minimizing effect of a background noise; receiving a local oscillated signal and generating a phase early-late local oscillated signal; compensating a phase early-late difference based on the background noise effect minimized RF input signal, the phase-early local oscillated signal and the phase-late local oscillated signal and generating a phase compensating signal; generating a phase compensating data for controlling a phase of the local oscillated signal based on the phase compensating signal; and compensating the phase of the local oscillated signal by feedback transmitting the phase compensating data.

BRIEF DESCRIPTION OF THE DRAWINGS

The above and other objects and features of the present invention will become apparent from the following description of the preferred embodiments given in conjunction with the accompanying drawings, in which:

FIG. 5 is a look-up data table showing the correlation difference e with respect to an amount of the phase difference;

DETAILED DESCRIPTION OF THE INVENTION

Other objects and aspects of the invention will become apparent from the following description of the embodiments with reference to the accompanying drawings, which is set forth hereinafter.

Figure 1:
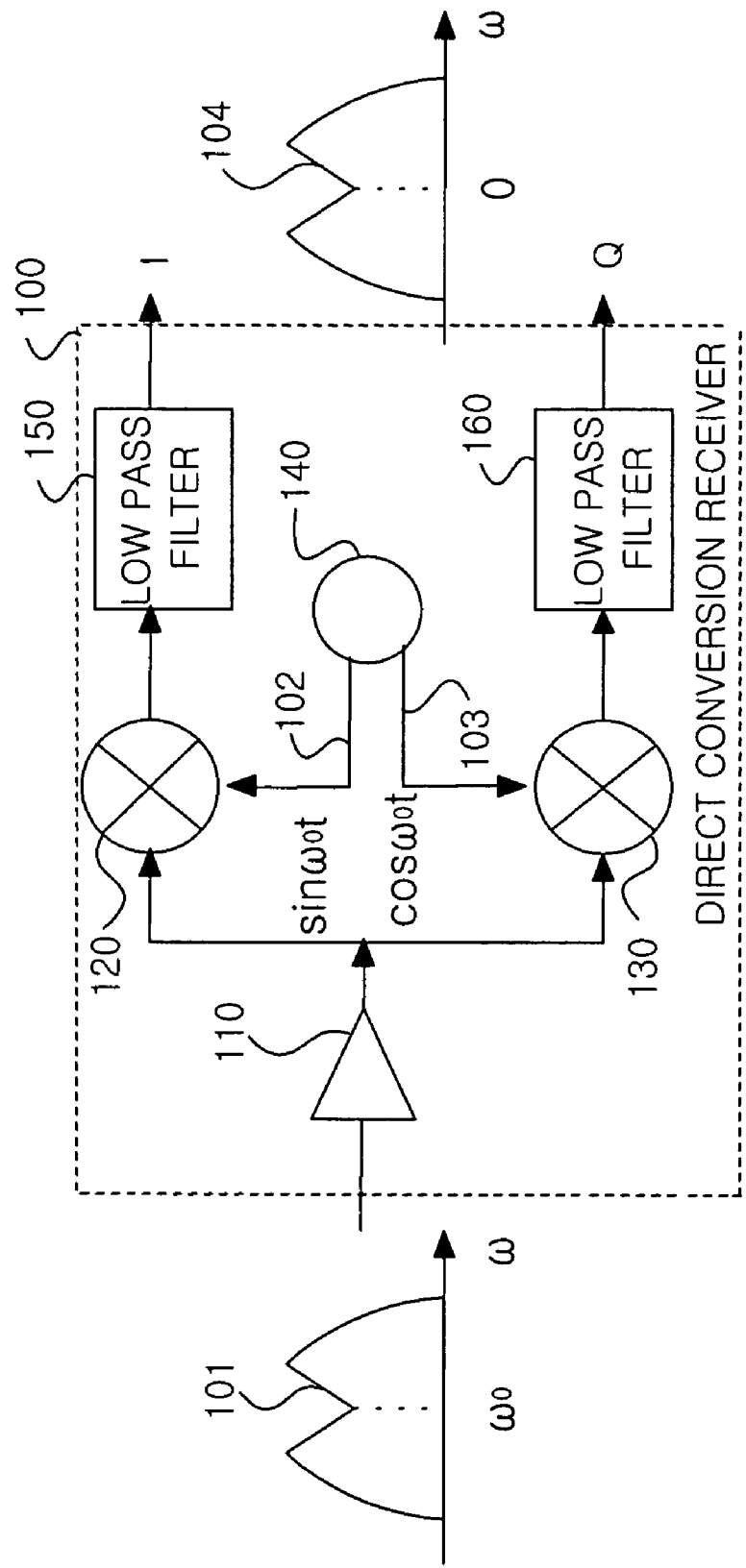
FIG. 1 is a block diagram showing the conventional direct conversion receiver.
Figure 2:
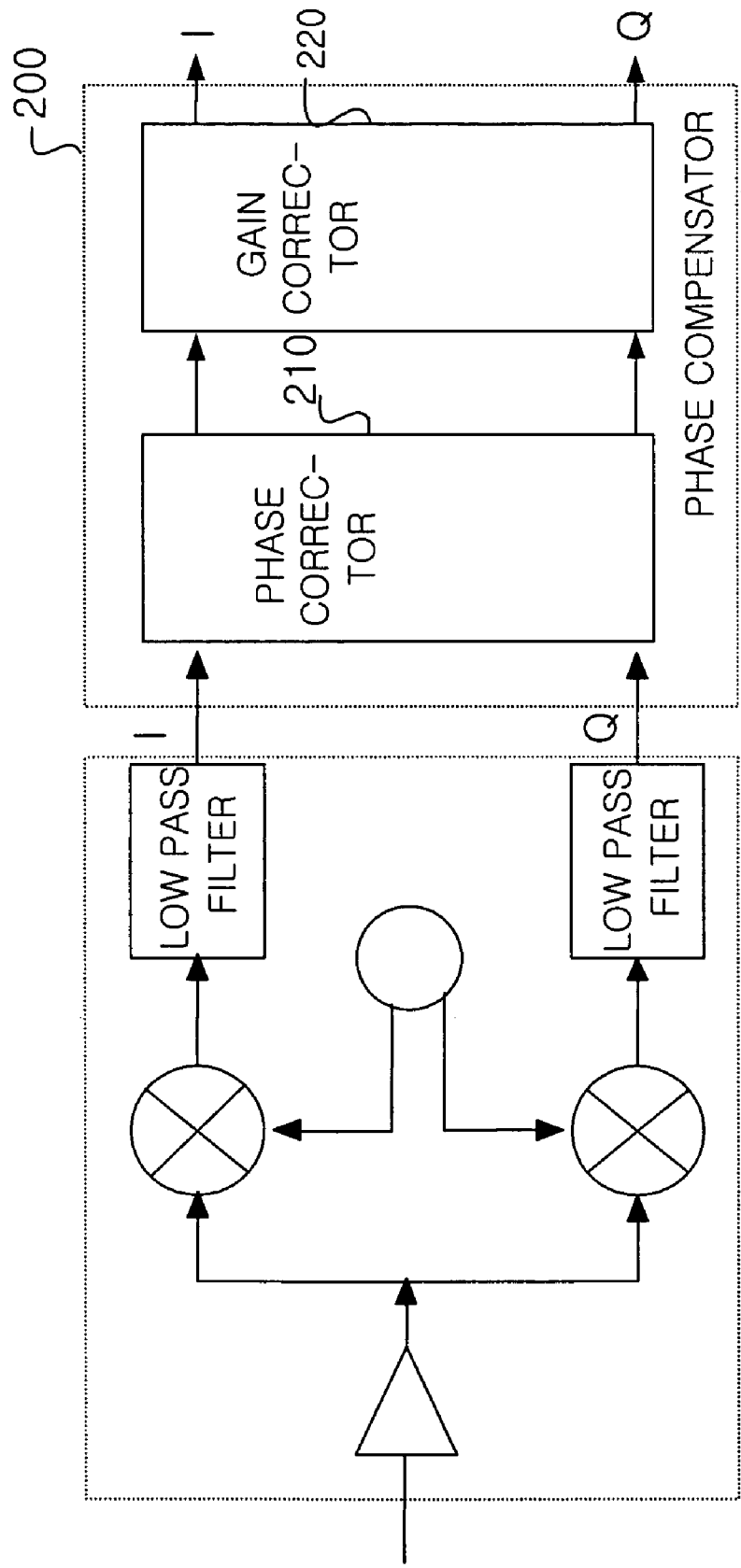
FIG. 2 is a block diagram illustrating an apparatus for compensating a phase difference between an radio frequency (RF) input signal and a local oscillated signal in accordance with a preferred embodiment.
Figure 3:
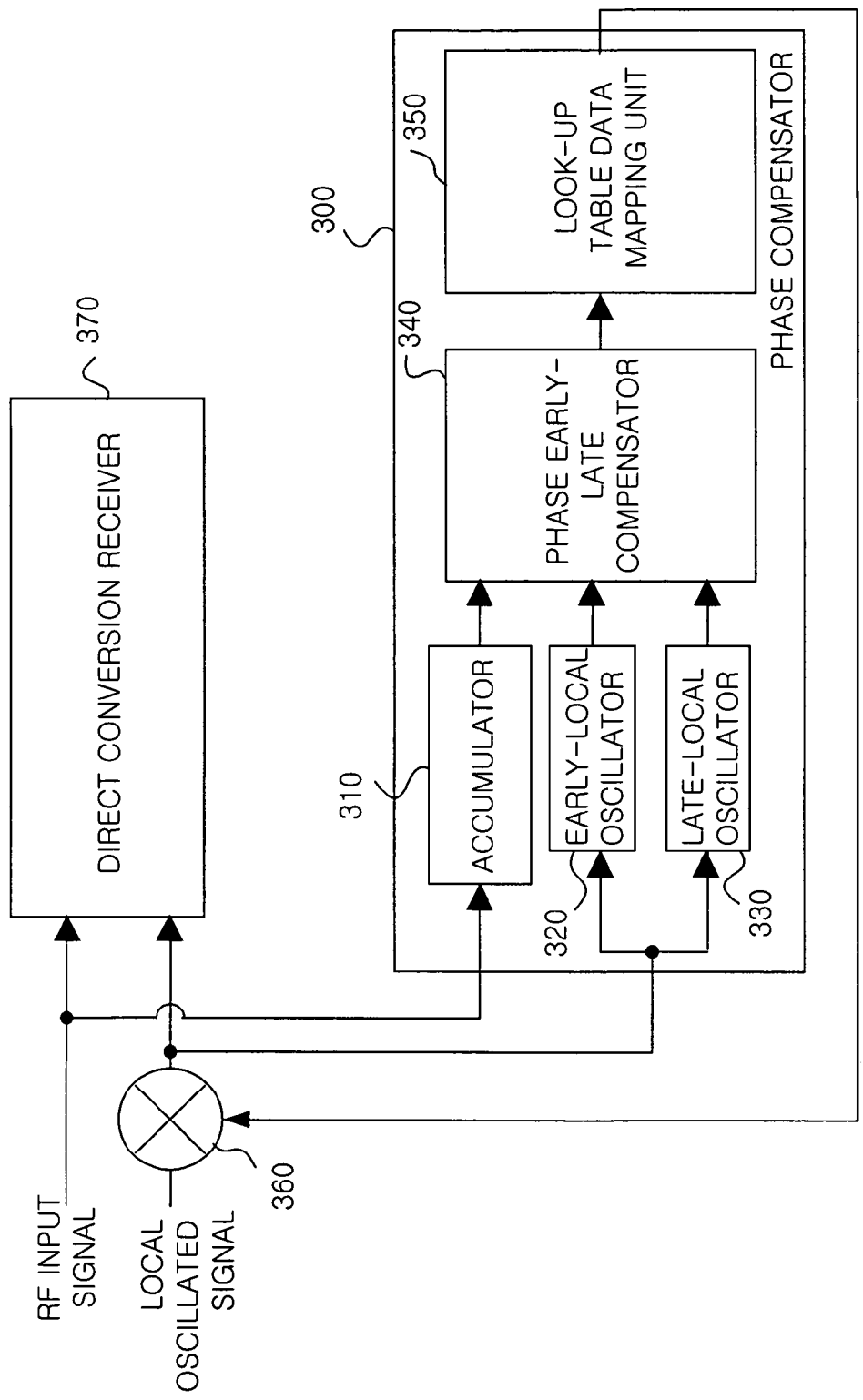
FIG. 3 is a block diagram illustrating an apparatus for compensating a phase difference between an RF input signal and a local oscillated signal of a receiver.

FIG. 3 is a block diagram illustrating an apparatus for compensating a phase difference between an RF input signal and a local oscillated signal, which are inputted to a receiver by using a phase early-late compensator in accordance with a preferred embodiment of the present invention.

As shown, the apparatus 300 for compensating a phase difference between an RF input signal and a local oscillated signal (hereinafter refer to a phase compensator) includes an accumulator 310, a early local oscillator 320, a late oscillator 330, a phase early-late compensator 340 and a lock-up table data mapping unit 350. The phase compensator 300 receives the RF input signal and the compensated local oscillated signal and generates a phase compensating feedback signal.

The accumulator 310 receives the RF input signal and accumulates the RF input signal in order to minimize an effect of a background noise occurred when the RF input signal is received and generates an accumulated RF input signal.

The early-local oscillator 320 receives a compensated local oscillated signal and generates an I channel local oscillated signal. The late-local oscillator 330 receives a compensated local oscillated signal and generates a Q channel local oscillated signal.

The phase early-late compensator 340 receives the accumulated RF input signal, the I channel local oscillated signal and the Q channel local oscillated signal, calculates a phase-early and a phase-late and generates a phase difference compensating signal between the compensated local oscillated signal and the RF input signal.

The look-up table data mapping unit 350 receives the phase difference compensating signal and generates an estimated phase difference signal in order to control a phase of the local oscillated signal.

The local oscillator 360 receives the local oscillated signal and then and shifts the phase of the local oscillated signal as a phase difference determined by the phase early-late compensator 340 and the look-up table data mapping unit 350.

That is, the phase difference between the local oscillated signal and the RF input signal is compensated based on the estimated phase difference signal from the phase compensator 300.

Figure 4:
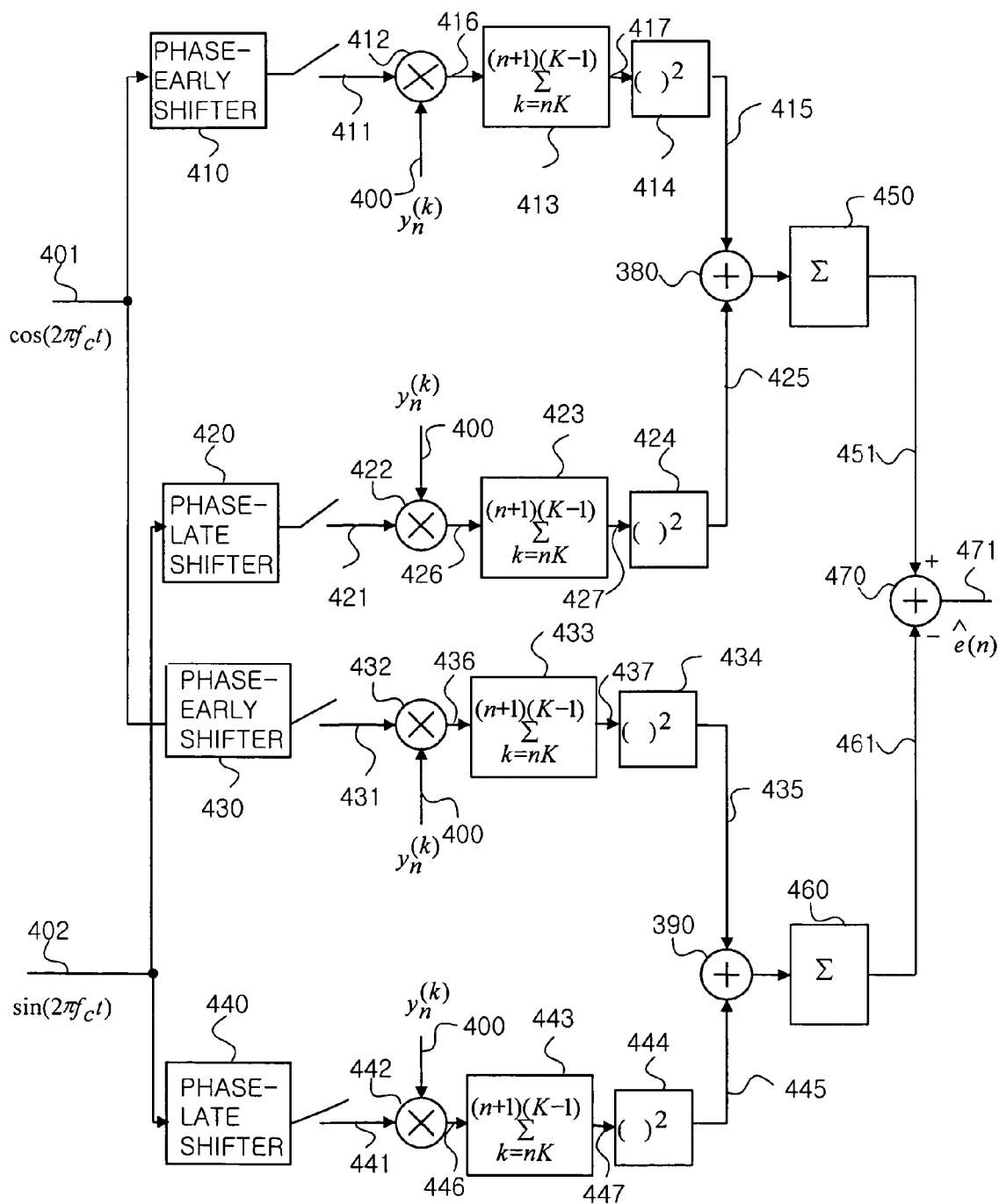
FIG. 4 is a block diagram showing the phase early-late compensator 340 of the phase compensator 300 for the receiver in accordance of a preferred embodiment of the present invention.

FIG. 4 is a block diagram showing the phase early-late compensator 340 of the phase compensator 300 for the receiver in accordance with a preferred embodiment of the present invention.

The phase early-late compensator 340 includes phase-early shifters 410 and 430, phase-late shifters 420 and 440, multiplexers 412, 422, 432 and 442, symbol adders 413, 423, 433 and 443, squarers 414, 424, 434 and 444, combiners 480, 490 and 470 and integrators 450 and 460.

The early-local oscillator 320 generates the I channel local oscillated signal 401, i.e., $\cos(2\pi f_c t)$ and the late-local oscillator 330 generates the Q channel local oscillated signal 402, i.e., $\sin(2\pi f_c t)$, which is 90 degree out of phase with I channel local oscillated signal 401.

The I channel local oscillated $\cos(2\pi f_c t)$ 401 is generated for restoring an I channel signal and the Q channel local oscillated signal $\sin(2\pi f_c t)$ 402 is generated for restoring a Q channel signal.

The phase-early shifters 410 receives the I channel local oscillated signal 401, shifts the I channel local oscillated signal with α radian phase-early and generates a phase-early I channel local oscillated signal 411, which is sampled at an interval of $$K = \frac{Tc}{Ts}.$$

The phase-early I channel local-oscillated signal $$Z_{I(n)}^{early}(k)$$

411 is expressed as:

$$Z_{I(n)}^{early}(k) = \cos\left(2\pi\frac{nk}{K} + \alpha\right) \qquad \text{Eq. (1)}$$

wherein n presents a nth symbol, k presents a kth sample and α is a phase shift.

The phase-early I channel local-oscillated signal 411 is passed through a correlation block including the multiplexer 412, the symbol adder 413 and the squarer 414 for calculating a phase-early I channel correlation value 415 with the RF input signal $y_{(n)}(k)$ 400.

The phase-early I channel multiplexed signal $$\tilde{Z}_{I(n)}^{early}(k)$$

416 of the phase-early I channel 411 and the RF input signal y(t) 400 is expressed as:

$$\tilde{Z}_{I(n)}^{early}(k) = \cos\left(2\pi\frac{nk}{K} + \alpha\right) \times \left(a_n A\cos\left(2\pi\frac{nk}{K} + \theta\right) + b_n A\sin\left(2\pi\frac{nk}{K} + \theta\right) + \eta_n(k)\right)$$  Eq. (2)

wherein n presents a nth symbol and k presents a kth sample.

$$y(t) = a_n A \cos(2\pi f_c t + \theta) + b_n A \sin(2\pi f_c t + \theta) + \eta(t)$$  Eq. (3)

The phase-early shifters 420 receives the Q channel local oscillated signal 402, shifts the Q channel local oscillated signal with α radian phase-early and generates a phase-early Q channel local oscillated signal 421, which is sampled at an interval of $$K = \frac{Tc}{Ts}.$$

The phase-early Q channel local-oscillated signal $$Z_{Q(n)}^{early}(k)$$

421 is expressed as:

$$Z_{Q(n)}^{early}(k) = \sin\left(2\pi\frac{nk}{K} + \alpha\right)$$  Eq. (4)

wherein n presents a nth symbol, k presents a kth sample and α is a phase shift.

The phase-early Q channel local-oscillated signal 421 is passed through a correlation block including the multiplexer 422, the symbol adder 423 and the squarer 424 for calculating a phase-early Q channel correlation value 425 with the RF input signal $y_{(n)}(k)$ 400.

The phase-early Q channel multiplexed signal $$\tilde{Z}_{Q(n)}^{early}(k)$$

426 of the phase-early Q channel signal 421 and the RF input signal 400 is expressed as:

$$\tilde{Z}_{Q(n)}^{early}(k) = \sin\left(2\pi\frac{nk}{K} + \alpha\right) \times \left(a_n A\cos\left(2\pi\frac{nk}{K} + \theta\right) + b_n A\sin\left(2\pi\frac{nk}{K} + \theta\right) + \eta_n(k)\right)$$  Eq. (5)

wherein n presents a nth symbol and k presents a kth sample.

The RF input signal 400 is expressed as the equation (3).

The symbol adders 413 and 423 add the phase-early I & Q channel multiplexed signals 416 and 426 based on a basis of a symbol by symbol, i.e., $$\sum_{k=nK}^{(n+1)(K-1)}$$

and generates a phase-early I & Q channel added signals 417 and 427.

The squarers 414 and 424 square the phase-early I & Q channel added signals 417 and 427 and generate the phase-early I channel correlation value 415 and the phase-early Q channel correlation value 425.

The phase-early I channel correlation value $\gamma_I^{early}(n)$ 415 is expressed as:

$$\gamma_I^{early}(n) = \left[\sum_{k=nK}^{(n+1)(K-1)} \tilde{Z}_{I(n)}^{early}(k)\right]^2$$  Eq. (6)

and the phase-early Q channel correlation value $\gamma_Q^{early}(n)$ 425 is expressed as:

$$\gamma_Q^{early}(n) = \left[\sum_{k=nK}^{(n+1)(K-1)} \tilde{Z}_{Q(n)}^{early}(k)\right]^2$$  Eq. (7)

The phase-late shifters 430 receives the I channel local oscillated signal 401, shifts the I channel local oscillated signal with α radian phase-late and generates a phase-late I channel local oscillated signal 431, which is sampled at an interval of $$K = \frac{Tc}{Ts}.$$

The phase-late I channel local-oscillated signal $$Z_{I(n)}^{late}(k)$$

431 is expressed as:

$$Z_{I(n)}^{late}(k) = \cos\left(2\pi\frac{nk}{K} - \alpha\right)$$  Eq. (8)

wherein n presents a nth symbol, k presents a kth sample and α is a phase shift.

The phase-late I channel local-oscillated signal 431 is passed through a correlation block including the multiplexer 432, the symbol adder 433 and the squarer 434 for calculating a phase-late I channel correlation value 435 with the RF input signal $y_{(n)}(k)$ 400.

The phase-late I channel multiplexed signal $$\tilde{Z}^{late}_{I(n)}(k)$$

436 of the phase-late I channel 431 and the RF input signal 400 is expressed as:

$$\tilde{Z}^{late}_{I(n)}(k) = \cos\left(2\pi\frac{nk}{K} - \alpha\right) \times \qquad (9)$$
$$\left(a_n A \cos\left(2\pi\frac{nk}{K} + \theta\right) + b_n A \sin\left(2\pi\frac{nk}{K} + \theta\right) + \eta_n(k)\right)$$

wherein n presents a nth symbol and k presents a kth sample.

The RF input signal 400 is expressed as the equation (3).

The phase-late shifters 440 receives the Q channel local oscillated signal 402, shifts the Q channel local oscillated signal with α radian phase-late and generates a phase-late Q channel local oscillated signal 441, which is sampled at an interval of $$K = \frac{Tc}{Ts}.$$

The phase-late Q channel local-oscillated signal $$Z^{late}_{Q(n)}(k)$$

441 is expressed as:

$$Z^{late}_{Q(n)}(k) = \sin\left(2\pi\frac{nk}{K} - \alpha\right) \qquad \text{Eq. (10)}$$

wherein n presents a nth symbol, k presents a kth sample and α is a phase shift.

The phase-late Q channel local-oscillated signal 441 is passed through a correlation block including the multiplexer 442, the symbol adder 443 and the squarer 444 for calculating a phase-late Q channel correlation value 445 with the RF input signal $y_{(n)}(k)$ 400.

The phase-late Q channel multiplexed signal 446 of the phase-late Q channel signal 441 and the RF input signal 400 is expressed as:

$$\tilde{Z}^{late}_{Q(n)}(k) = \sin\left(2\pi\frac{nk}{K} - \alpha\right) \times \qquad \text{Eq. (11)}$$
$$\left(a_n A \cos\left(2\pi\frac{nk}{K} + \theta\right) + b_n A \sin\left(2\pi\frac{nk}{K} + \theta\right) + \eta_n(k)\right)$$

wherein n presents a nth symbol and k presents a kth sample.

The RF input signal 400 is expressed as the equation (3).

The symbol adders 433 and 443 add the phase-late I & Q channel multiplexed signals 436 and 446 based on a basis of a symbol by symbol, i.e., $$\sum_{k=nK}^{(n+1)(K-1)}$$

and generates a phase-late I & Q channel added signals 437 and 447.

The squarers 434 and 444 square the phase-late I & Q channel added signals 437 and 447 and generate the phase-late I channel correlation value 435 and the phase-late Q channel correlation value 445.

The phase-late I channel correlation value $\gamma_Q^{late}(n)$ 435 is expressed as:

$$\gamma_I^{late}(n) = \left[\sum_{k=nk}^{(n+1)(K-1)} \tilde{Z}^{late}_{I(n)}(k)\right]^2 \qquad \text{Eq. (12)}$$

and the phase-late Q channel correlation value $\gamma_Q^{late}(n)$ 445 is expressed as:

$$\gamma_Q^{late}(n) = \left[\sum_{k=nk}^{(n+1)(K-1)} \tilde{Z}^{late}_{Q(n)}(k)\right]^2 \qquad \text{Eq. (13)}$$

Because $\gamma_I^{lealry}(n)$ 415, $\gamma_Q^{learly}(n)$ 425, $\gamma_I^{early}(n)$ 435 and $\gamma_Q^{late}(n)$ 445 are correlation values of the phase early-late I&Q channel local oscillated signals 411, 421, 431 and 441 and the RF input signal 400, respectively.

The phase difference between the early-late local oscillated signals for I channel and Q channel and the RF input signal can be calculated based on $\gamma_I^{learly}(n)$ 415, $\gamma_Q^{early}(n)$ 425, $\gamma_1^{late}(n)$ 435 and $\gamma_Q^{late}(n)$ 445, the phase difference of the local-oscillated signal can be calculated from the correlation values 415, 425, 435 and 445.

The adder 450 adds the phase-early I channel correlation value $\gamma_I^{learly}(n)$ 415 and the phase-early Q channel correlation value $\gamma_Q^{learly}(n)$ 425 and generates a phase-early correlation value $\gamma_{early}(n)$ 451. The adder 460 adds the phase-late I channel correlation value $\gamma_I^{late}(n)$ 435 and the phase-late Q channel correlation value $\gamma_Q^{late}(n)$ 445 and generates a phase-late correlation value $\gamma_{late}(n)$ 461.

The phase-early correlation value $\gamma_{learly}(n)$ 451 is expressed as:

$$\gamma_{learly}(n) = \gamma_I^{early}(n) + \gamma_Q^{early}(n) \qquad \text{Eq. (14)}$$

and the phase-late correlation value $\gamma_{late}(n)$ 461 is expressed as:

$$\gamma_{late(n)} = \gamma_I^{late}(n) + \gamma_Q^{late}(n) \qquad \text{Eq. (15)}$$

The adder 470 subtracts the phase-late correlation value $\gamma_{late}(n)$ 461 from the phase-early correlation value $y_{early}(n)$ 451 and generates an estimated correlation $\iota(n)$ 471 is expressed as:

$$\iota(n) = \gamma_{early}(n) - \gamma_{late}(n) \qquad \text{Eq. (16)}$$

Estimated correlation $\iota(n)$ 471 is calculated in order to compensate a phase difference between the local oscillated signal and the RF input signal.

Because the estimated correlation $\iota(n)$ 471 includes information of a phase difference, a phase difference can be determined based on the estimated correlation $\iota(n)$ 471.

Therefore, the phase early-late compensator 340 generates the estimated correlation $\iota(n)$ 471 presenting the estimated phase difference between the local oscillated signal and the RF input signal.

The look-up table data mapping unit 350 is searched based on the estimated correlation $\iota(n)$471 in order to searching the real phase difference. The look-up table data mapping unit 350 stores predetermined correlation values in the memory.

Generating the look-up table data is described as follows.

Local oscillated signals for a period having α radian phase difference are expressed as:

$$lo_I^{early}(k) = \sum_{k=0}^{(K-1)} \cos\left(2\pi\frac{k}{K} + \alpha\right),$$ Eq. (17)

$$lo_I^{late}(k) = \sum_{k=0}^{(K-1)} \cos\left(2\pi\frac{k}{K} - \alpha\right),$$ Eq. (18)

$$lo_Q^{early}(k) = \sum_{k=0}^{(K-1)} \sin\left(2\pi\frac{k}{K} + \alpha\right) \text{ and}$$ Eq. (19)

$$lo_Q^{late}(k) = \sum_{k=0}^{(K-1)} \sin\left(2\pi\frac{k}{K} - \alpha\right)$$ Eq. (20)

The RF input signal of nth symbol, which has a phase difference θ is expressed as:

$$y_n(k) = \sum_{k=0}^{(K-1)} [\cos(2\pi f_c nk/K + \theta) + \sin(2\pi f_c nk/K + \theta)] + \eta(n)$$ Eq. (21)

wherein assume that an input data 1 is transmitted, that is, $a_n=1$, $b_n=1$.

A phase-early correlation value $\gamma_y^{early}(n)$ and a phase-late correlation value $\gamma_y^{late}(n)$ between the local oscillated signal lo(k) and the RF input signal $y_n(k)$ for estimating a phase difference thereof are expressed as:

$$\gamma_y^{early}(n) = \frac{1}{K}\sum_{k=0}^{K-1} [lo_I^{early}(k) + lo_Q^{early}(k)] \times y(k)$$ Eq. (22)

and $$\gamma_y^{late}(n) = \frac{1}{K}\sum_{k=0}^{K-1} [lo_I^{late}(k) + lo_Q^{late}(k)] \times y(k)$$ Eq. (23)

Base on the phase early-late correlation values Eq. 22 and 23, a correlation difference e(n) can be calculated and is expressed as:

$$e(n) = \gamma_y^{early}(n) - \gamma_y^{late}(n)$$ Eq. (24)

FIG. 5 is a look-up data table showing the correlation difference e with respect to an amount of the phase difference.

As shown, the data is generated at every 10 degree of a phase difference. The phase difference α of the local oscillated signal is 30 degree ( $$30 \times \frac{\pi}{180}$$

radian). The phase-early correlation values $\gamma_y^{early}(n)$ and phase-late correlation values $\gamma_y^{late}(n)$ are 1, regularly.

Referring to FIG. 5, because the correlation difference e is varied with the phase difference θ of the RF input signal y(k), the phase difference θ can be calculated based on the e.

That is, an estimated phase difference θ can be determined by comparing the estimated correlation ê and the correlation difference e.

The estimated phase difference $\hat{\theta}$ is expressed as:

$$\hat{\theta} = arg\theta\min|e(\theta) - \hat{e}(\theta)|$$ (Eq. 25)

The phase difference θ minimizing an absolute value of the difference between the estimated correlation ê and the correlation difference e, i.e., $|e(\theta) - \hat{e}(\theta)|$ becomes the estimated phase difference $\hat{\theta}$.

The estimated phase difference $\hat{\sigma}$ by the early-late phase compensator is transmitted to the local oscillator 360 as a feedback signal for compensating the phase difference. The compensated local oscillated signal from the local oscillator 360 is expressed as:

$$lo(t) = \cos(2\pi f_c t + \hat{\theta})$$ Eq. (26)

The compensated local oscillated signal and the RF input signal are transmitted to the direct conversion receiver 370.

Because the estimated phase difference $\hat{\theta}$ is varied with time, the estimated phase difference $\hat{\theta}$ has to be estimated repeatedly. However, it is impossible to estimate the phase difference for each data because the phase early-late compensator 340 has a time delay for calculating a phase difference compensating signal. Thus, ideally, a phase difference has to be estimated at every data block, the phase difference is estimated at every N data blocks in real situation, wherein a phase difference which is changed slowly in a block cannot be estimated.

Therefore, the phase early-late compensator 340 compensates the phase difference based on feedback process and is expressed as:

$$\hat{e}(n+1) = (1-\rho) \cdot \hat{e}(n) + \rho \cdot \hat{e}(n+1)$$ (27)

wherein ρ is an integer which is smaller than 1 and is an weight value of ê(n) and ê(n+1).

Refer to FIG. 3, the RF input signal is accumulated by the accumulator 310 for minimizing a background noise. Because the estimated correlation ê(n) is determined according to the background noise, it is important to minimize an effect of the background noise for correctly estimating a phase difference.

As shown, the RF input signal is passed through the accumulator 310 and then is transmitted to the phase early-late compensator 340.

The accumulator 310 receives the RF input signal. The accumulator 310 collects N symbols in a memory on a symbol by symbol basis wherein N is the number of accumulation length. The accumulator 310 adds the collected N symbols so that effect of the background noise can be minimized.

If the N RF input signal which is sampled at K per symbol is accumulated, the accumulated RF signal is expressed as:

$$\hat{y} = \sum_{n=0}^{N}\sum_{k=0}^{N} y(nkTs)$$ Eq. (28)

Figure 6:
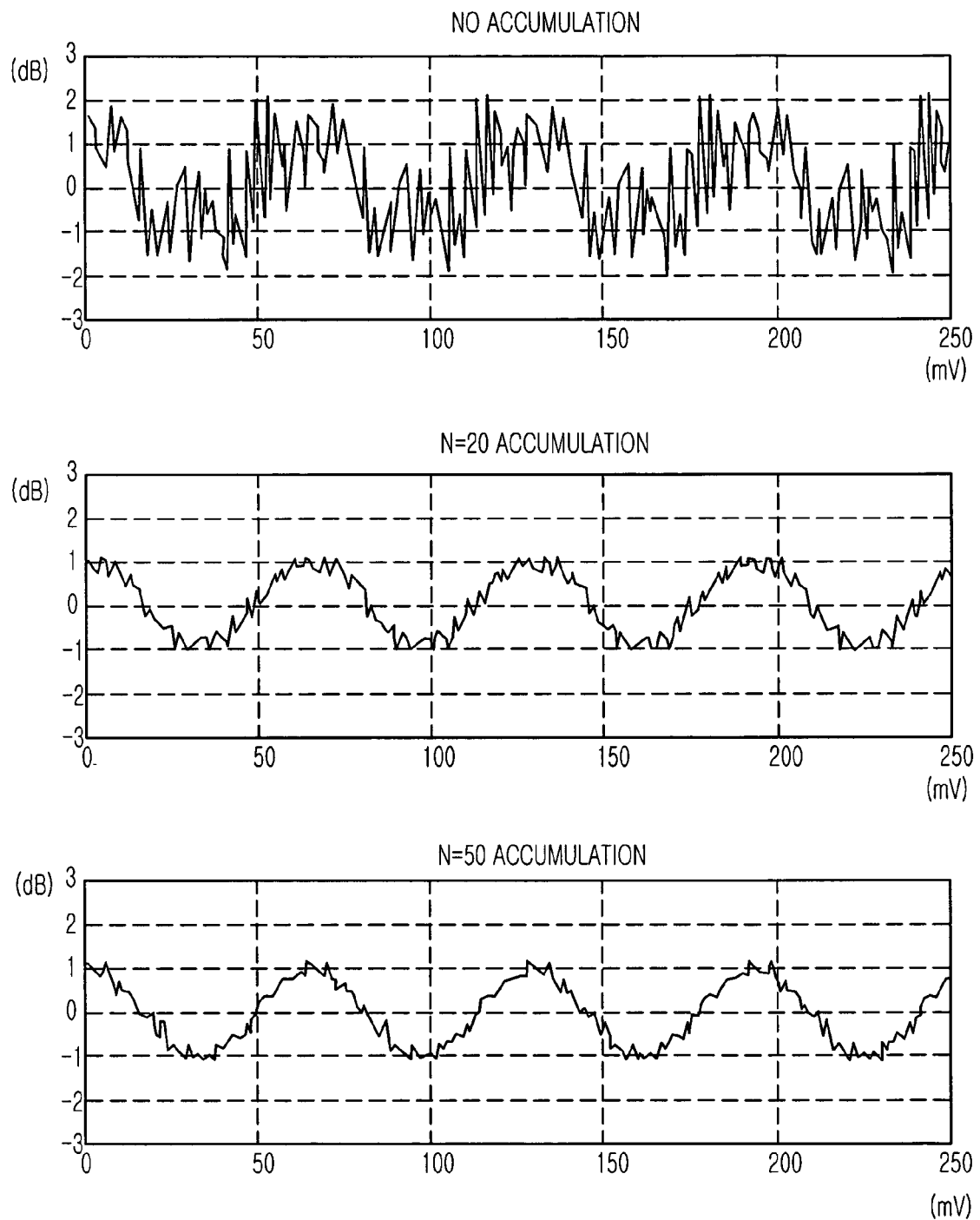
FIG. 6 is a graph showing waveforms according to the number of the accumulation in accordance with a preferred embodiment of the present invention.

FIG. 6 is a graph showing waveforms according to the number of the accumulation in accordance with a preferred embodiment of the present invention.

The waveforms are signal to noise ratios (SNR)s in a range of 2 dB when N is 0, 20 and 50 and shows that the effect of the background noise is small when the accumulation length is large.

FIGS. 7A to 7D are graphs showing performance of the estimation phase difference with respect to the accumulation time in accordance with a preferred embodiment of the present invention.

Referring to FIGS. 7A to 7D, for the embodiment, a differential Quadrature phase shifting keying (DQPSK) is used, the phase difference α for shifting at the phase early-late compensator 340 is 30 degree and the SNR is 2 dB.

FIGS. 7A to 7D show the phase difference according to the number of the accumulation length.

Figure 7A:
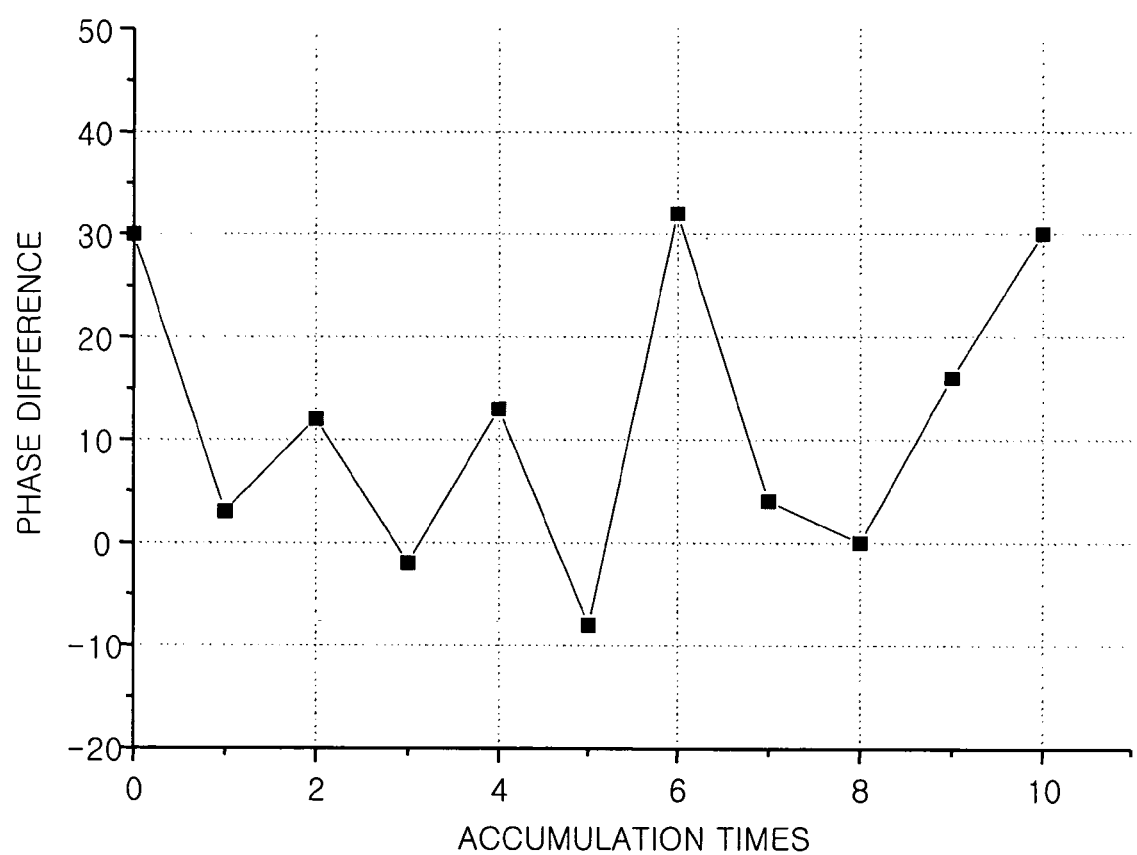
FIGS. 7A to 7D are graphs showing performance of the estimation phase difference with respect to the accumulation time in accordance with a preferred embodiment of the present invention.
Figure 7B:
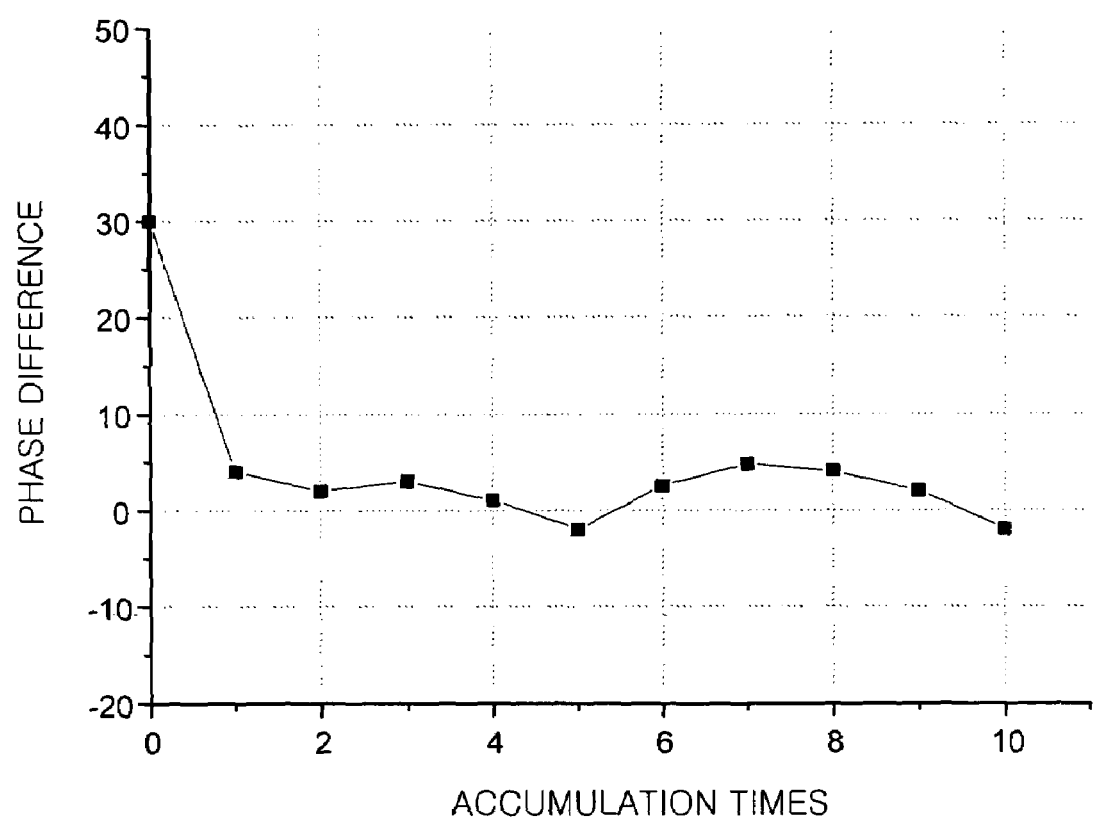
Figure 7C:
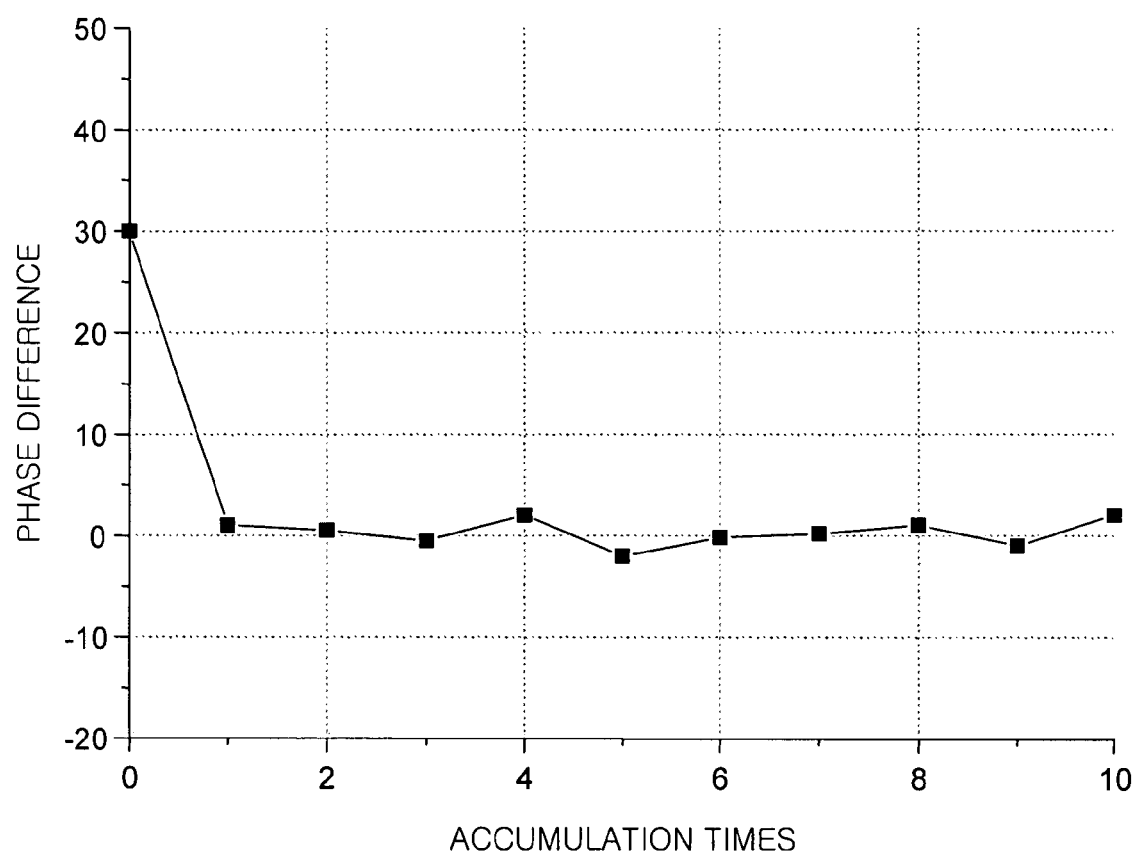

Referring to FIG. 7A, the accumulation length N is 1. When the accumulation time is increased, the phase difference is largely changed. However, refer to FIG. 7B, the accumulation length N is 20. Comparing to FIG. 7A, the phase difference is changed in a small range. Refer to FIG. 7C, the accumulation length N is 50, the phase difference is in significantly.

If the SNR is low, the effect of the background noise dramatically affects for estimating the phase difference. Thus, by increasing the accumulation length N, the effect of the background noise can be decreased. On the other hand, if the SNR is high, the appropriate estimation can be achieved with the relatively small accumulation length N.

Figure 7D:
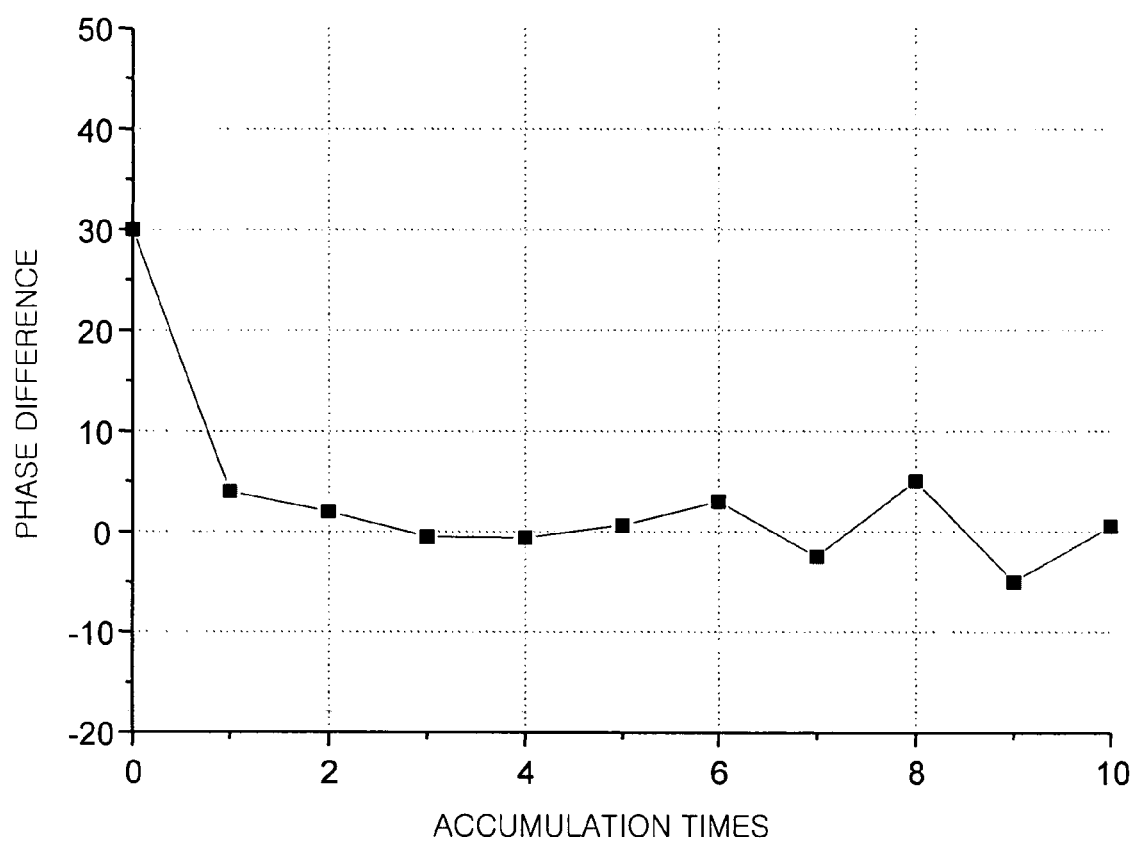

Referring to FIG. 7D, the SNR is 8 dB and the accumulation length N is 1. When the SNR is high, the phase difference is changed insignificantly with the small accumulation length N.

Figure 8:
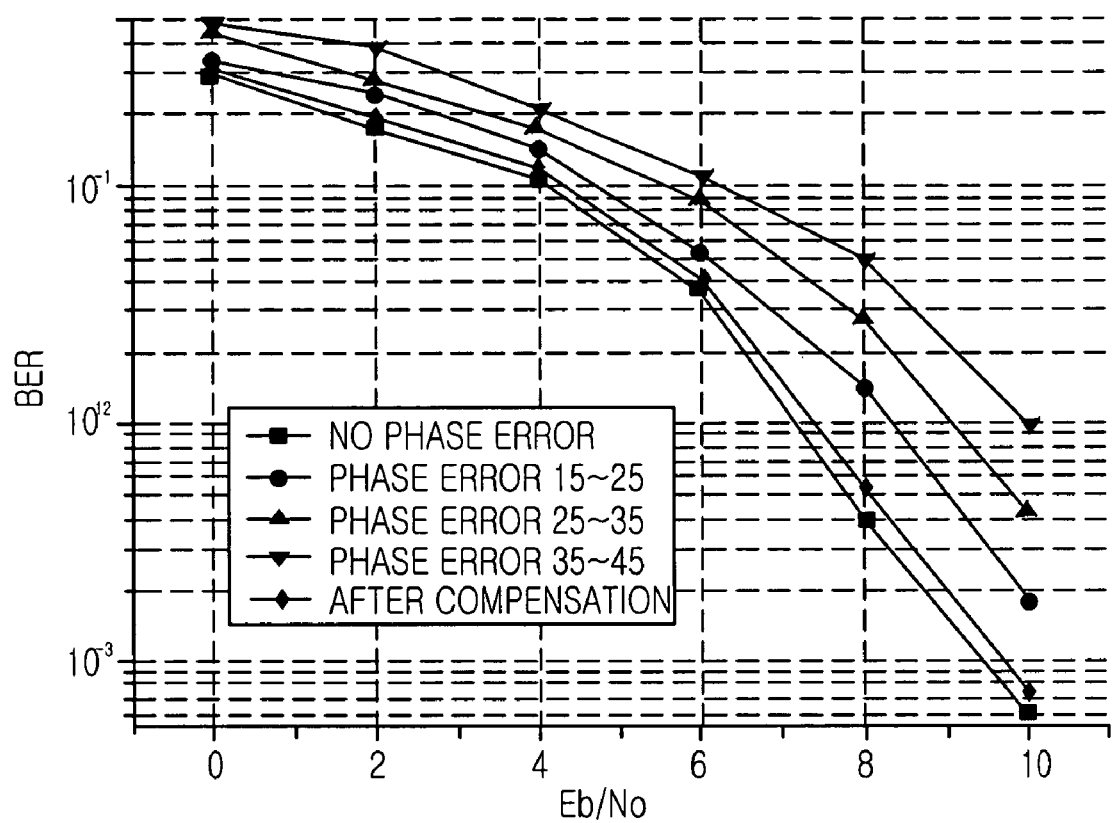
FIG. 8 is a graph showing a bit error rate (BER) versus energy per a bit to noise ratio ($E_b/N_o$) with respect to a phase error of the direct conversion receiver in accordance with the present invention.

FIG. 8 is a graph showing a bit error rate (BER) versus energy per a bit to noise ratio ($E_b/N_o$) with respect to a phase error of the direct conversion receiver in accordance with the present invention. When the phase error is decreased, the BER is decreased, i.e., the performance of the RF input signal is improved.

Figure 9:
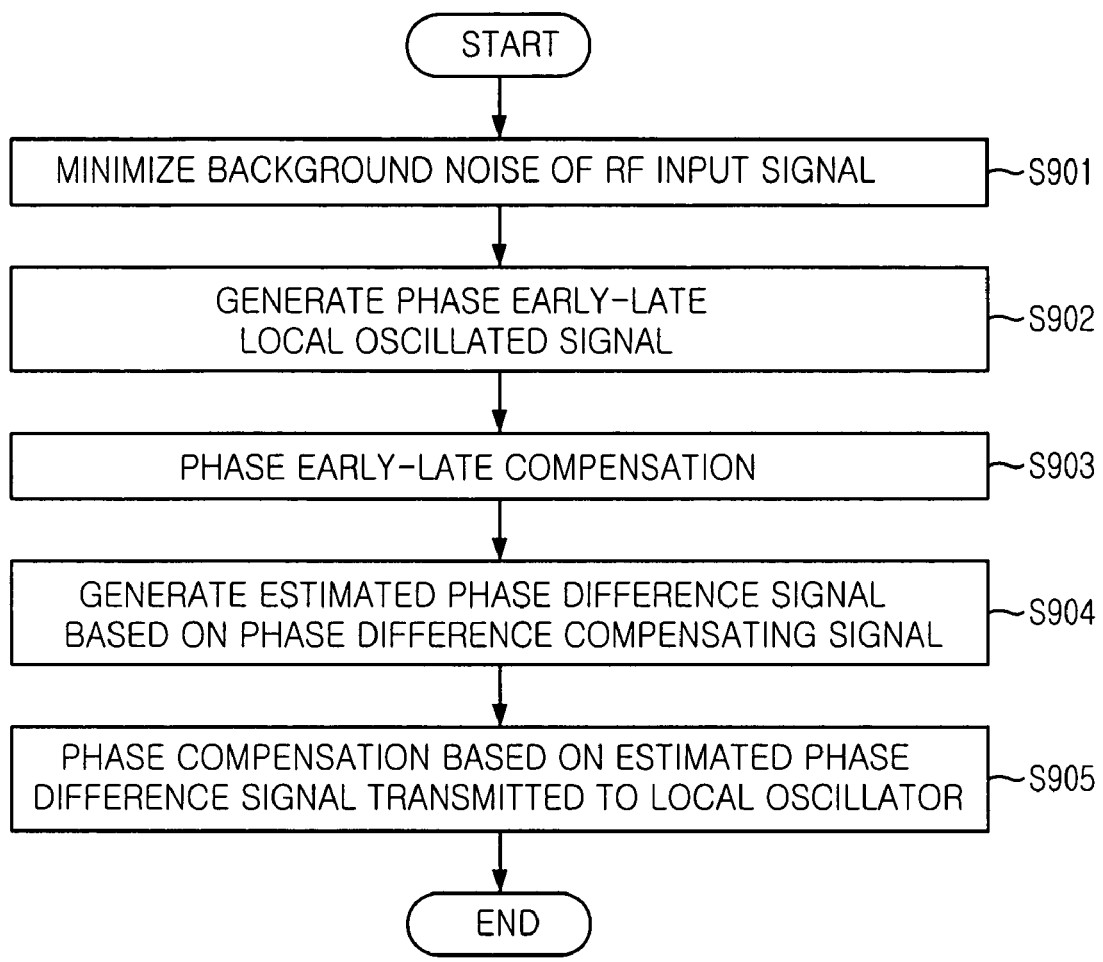
FIG. 9 is a flowchart showing a method for compensating a phase difference of a direct conversion receiver in accordance with a preferred embodiment of the present invention.

FIG. 9 is a flowchart describing a method for compensating a phase difference of a direct conversion receiver in accordance with a preferred embodiment of the present invention.

At first, the effect of the background noise of the RF input signal is minimized by the accumulator 310 at step S901.

The phase-early local oscillated signal and the phase-late local oscillated signal is generated from the local oscillated signal by the phase-early local oscillator 320 and the phase-late local oscillator 330 at step S902.

The phase difference is compensated based on the RF input signal of which background noise is minimized, the phase-early local oscillated signal and the phase-late local oscillated signal by the phase early-late compensator 340 and the phase difference compensating signal at step S903.

Based on the phase difference compensating signal, the estimated phase difference signal is generated for controlling the phase of the local oscillated signal by the look-up table data mapping unit 350 at step S904.

The estimated phase difference signal is transmitted to the local oscillator 360 for feedback control at step S905.

The present invention compensates the phase difference between the RF input signal and the local oscillated signal, which is occurred at the direct conversion receiver or the digital receiver in order to prohibit degradation of the RF input signal and improve quality of the transmitted RF input signal. More particularly, the phase early-late local oscillated signals are generated from the local oscillated. The phase difference is extracted based on the phase early-late local oscillated signals and the RF input signal by the phase early-late compensator. The phase compensating data is generated based on the phase difference by the look-up table data mapping unit. The phase of the local oscillated signal is controlled based on the phase compensating data. The RF input signal includes the background noise. Because and the background noise affects largely to extract a phase, the effect of the background noise is minimized by the accumulator. Therefore, the present invention saves the receiving time and improves the quality of the received signal.

As above-mentioned, the method of the present invention can be embodied as a program and stored in recording media (CD-ROM, RAM, floppy disk, hard disk, magneto-optical disk, etc.) readable by a computer.

The effect of the present invention for compensating phase a difference using an early-late phase compensator and an accumulator of a receiver input part for improving degradation of receive in the result of phase difference between receive Radio Frequency (RF) of a direct conversion receiver and/or a digital receiver and a local oscillator signal, and improving the receive performance by minimizing effect of a channel noise affecting phase compensation.

The present application contains subject matter related to Korean paten application No. 2003-98408, filed in the Korean Patent Office on Dec. 27, 2003, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for compensating a phase difference of a receiver, the apparatus comprising:
   an accumulating means for accumulating a radio frequency (RF) input signal and generating an accumulated RF signal in order to minimize an effect of a background noise of the RF input signal;
   an early-local oscillating means for generating a phase-early local oscillated signal based on a local oscillated signal of the receiver;
   a late-local oscillating means for generating a phase-late local oscillated signal based on a local oscillated signal of the receiver;
   a phase early-late compensating means for compensating a phase early-late based on the accumulated RF input signal and the phase-early and phase-late local oscillated signals;
   a look-up table data mapping means for controlling a phase of the local oscillated signal with respect to a phase difference from the phase early-late compensating means; and
   a feedback transmitting means for transmitting a phase compensating data from the look-up table data mapping means to the local oscillator.

2. The apparatus as recited in claim 1, wherein the phase early-late compensating means includes:
   a phase early-late shifting means for generating phase early-late local oscillated signals based on an I channel local oscillated signal from the early-local oscillating means and a Q channel local oscillated signal from the late-local oscillating means;
   a correlating means for generating a correlation value between the RF input signal and the phase-shifted local oscillated signal of the I channel and the Q channel; and an adding means for estimating a phase difference of the local oscillated signals of the I channel and the Q channel.

3. The apparatus as recited in claim 2, wherein the phase early-late shifting means includes:
   a first phase-early shifting means for shifting the phase-early local oscillated signal as a predetermined phase;
   a first phase-late shifting means for shifting the phase-late local oscillated signal as a predetermined phase;
   a second phase-early shifting means for shifting the phase-late local oscillated signal which is 90 degree out of phase with the phase-early local oscillated signal as a predetermined phase; and
   a second phase-late shifting means for shifting the phase-late local oscillated signal which is 90 degree out of phase with the phase-early local oscillated signal as a predetermined phase.

4. The apparatus as recited in claim 2, wherein the correlating means includes:
   a multiplexing means for multiplexing a phase-shifted local oscillated signal from the phase-early shifting means and the phase-late shifting means and the RF input signal and generating a multiplexed signal;
   a symbol adding means for adding the multiplexed signal based on a symbol by symbol basis and generating an added signal; and
   a squaring means for squaring the added signal.

5. The apparatus as recited in claim 2, wherein the adding means includes:
   a first adding means for generating a correlation value between the phase-shifted local oscillated signals; and
   a second adding means for adding correlation values of the phase-early local oscillated signal of the I and Q channels and adding correlation values of the phase-late local oscillate signal of the I and Q channels, thereby estimating the phase error.

6. The apparatus as recited in claim 1, wherein the look-up table data mapping means measures a correlation value for look-up table data and stores the correlation value in a memory.

7. A method for compensating a phase difference of a receiver, the method comprising the steps of:
   a) receiving an radio frequency (RF) input signal and minimizing effect of a background noise;
   b) receiving a local oscillated signal and generating a phase early-late local oscillated signal;
   c) compensating a phase early-late difference based on the background noise effect minimized RF input signal, the phase-early local oscillated signal and the phase-late local oscillated signal and generating a phase compensating signal;
   d) generating a phase compensating data for controlling a phase of the local oscillated signal based on the phase compensating signal; and
   e) compensating the phase of the local oscillated signal by feedback transmitting the phase compensating data.

8. The method as recited in claim 7, wherein the step a) includes the steps of:
   minimizing the effect of the background noise by using the accumulator and
   controlling an accumulation length according to signal to noise ratio and an accumulation time.

* * * * *